(12) United States Patent  
Whiton et al.

(10) Patent No.: US 8,076,039 B2  
(45) Date of Patent: Dec. 13, 2011

(54) SMALL VOLUME, FUEL CELL INLET FUEL GAS DISTRIBUTOR HAVING LOW PRESSURE DROP

(75) Inventors: John H. Whiton, South Windsor, CT (US); Yu Wang, Rocky Hill, CT (US); Carl A. Reiser, Stonington, CT (US); George S. Hirko, Jr., Manchester, CT (US)

(73) Assignee: UTC Power Corporation, South Windsor, CT (US)

( * ) Notice: Subject to any disclaimer, the term of this patent is extended or adjusted under 35 U.S.C. 154(b) by 1517 days.

(21) Appl. No.: 11/506,686

(22) Filed: Aug. 18, 2006

(65) Prior Publication Data

US 2006/0280995 A1  Dec. 14, 2006

Related U.S. Application Data

(63) Continuation of application No. 10/725,863, filed on Dec. 2, 2003, now abandoned.

(51) Int. Cl.
*H01M 8/04* (2006.01)
*H01M 2/38* (2006.01)
*H01M 2/40* (2006.01)
*H01M 8/24* (2006.01)

(52) U.S. Cl. ........ 429/456; 429/428; 429/443; 429/444; 429/458

(58) Field of Classification Search ............... 429/12
See application file for complete search history.

(56) References Cited

U.S. PATENT DOCUMENTS

| 4,670,361 | A | * | 6/1987 | Tsutsumi et al. | 429/458 |
| 5,622,606 | A | | 4/1997 | Kügler et al. | |
| 2003/0118878 | A1 | * | 6/2003 | Pinto | 429/13 |
| 2003/0124410 | A1 | * | 7/2003 | Yi et al. | 429/38 |
| 2004/0072056 | A1 | * | 4/2004 | Whiton et al. | 429/38 |
| 2005/0069749 | A1 | * | 3/2005 | Frank et al. | 429/38 |

* cited by examiner

*Primary Examiner* — Basia Ridley  
*Assistant Examiner* — Sean P Cullenn  
(74) *Attorney, Agent, or Firm* — M. P. Williams

(57) ABSTRACT

In a fuel cell stack, an inlet fuel distributor (15, 31, 31a, 31b) comprises a plurality of fuel distributing passageways (17-23, 40-47, 64) of substantially equal length and equal flow cross section to uniformly distribute fuel cell inlet fuel from a fuel supply conduit (13, 14, 50) to a fuel inlet manifold (28). The conduits may be either channels (40-47; 64) formed within a plate (39) or tubes (17-23). The channels may have single exits (65) or double exits (52, 53) into the fuel inlet manifold.

19 Claims, 3 Drawing Sheets

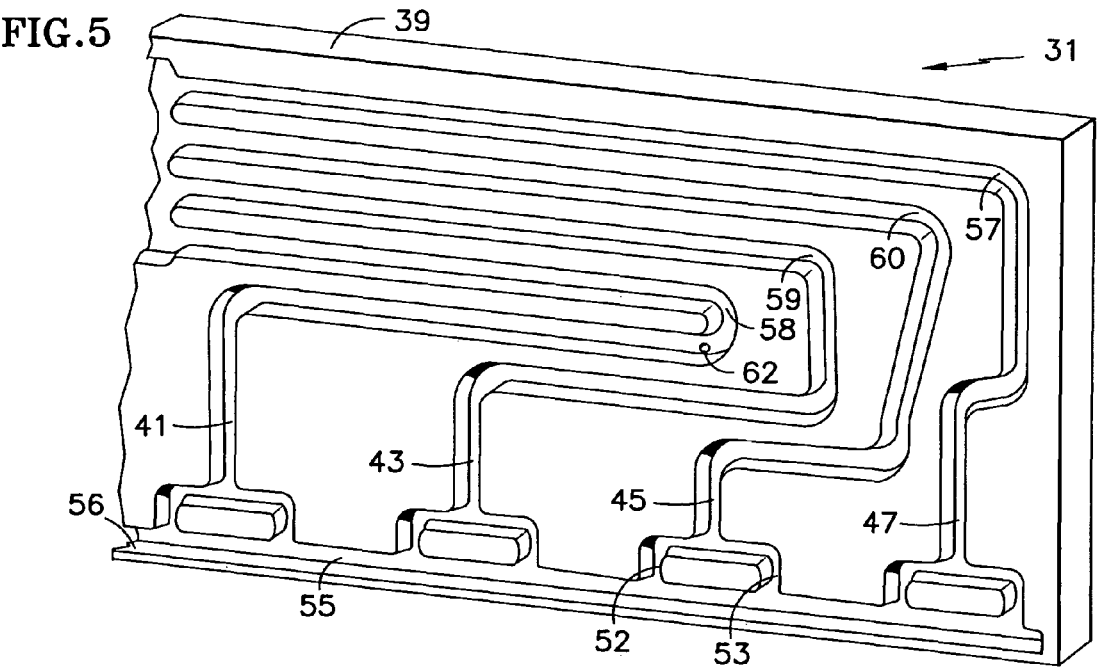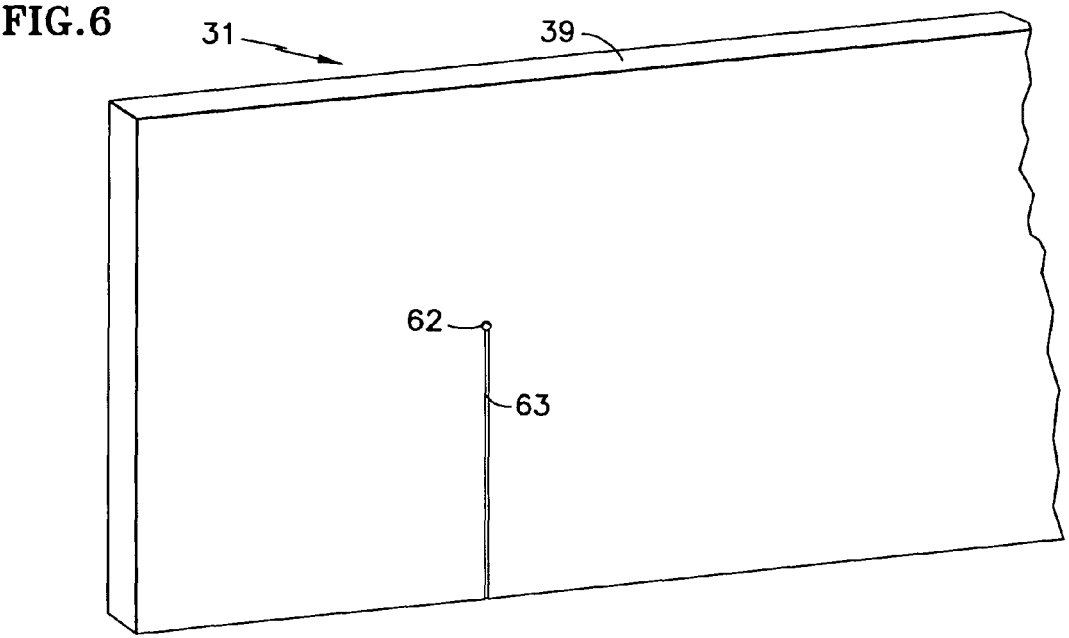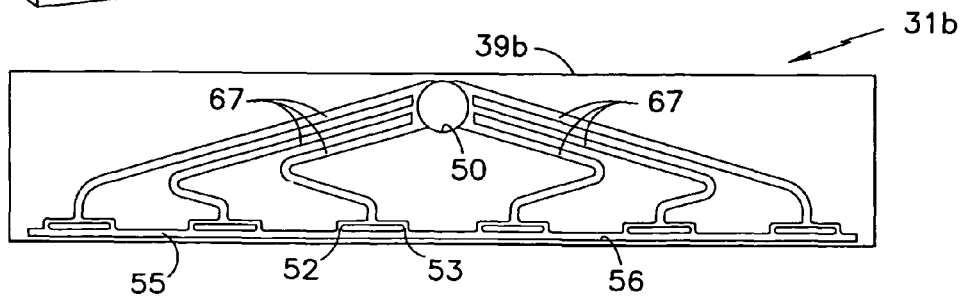

SMALL VOLUME, FUEL CELL INLET FUEL GAS DISTRIBUTOR HAVING LOW PRESSURE DROP

CROSS REFERENCE TO RELATED APPLICATIONS

This application is a continuation of U.S. patent application Ser. No. 10/725,863 filed Dec. 2, 2003 now abandoned.

TECHNICAL FIELD

A fuel cell inlet fuel gas distributor has a plurality of fuel conduits of substantially equal length and flow capacity which supply substantially uniform fuel substantially simultaneously across the length of a fuel inlet manifold.

BACKGROUND ART

The uneven distribution of fuel to the different fuel cells upon startup can lead to individual fuel cell fuel starvation, voltage reversal, and carbon corrosion, which ultimately results in severe performance loss.

In U.S. patent application Ser. No. 10/269,654, filed Oct. 10, 2002, now U.S. Pat. No. 6,924,056, a fuel cell, fuel inlet flow control apparatus divides the fuel flow several times, successively, in a cascade fashion to provide a number of separate flows, and then spreads the flow so as to distribute the fuel substantially uniformly across the entrances to all of the fuel flow fields in the fuel cell stack. Fuel flow transients approach the fuel flow fields of all of the fuel cells in the stack substantially simultaneously and at substantially the same flow rate, during startup and other transient fuel flow conditions. In a disclosed embodiment, the flow is split successively four times and then the flow through all of the outlet passages from the cascade region impinges on a flat surface, which spreads the flow uniformly. Although the cascade fuel distributor does distribute the fuel quite evenly, it has a significant pressure loss, and the volume consumed thereby is too large for certain applications. Geometrical constraints may prevent optimal design, in certain applications.

SUMMARY

Features include: simplified distribution of fuel at the fuel inlet of a PEM fuel cell; providing fuel of substantially uniform flow to the flow fields of all of the fuel cells in a fuel cell stack; substantially simultaneous delivery of a substantially equal amount of fuel to each of the flow fields in a fuel cell stack; increased durability of fuel cell stacks; improved response to startup and other fuel input transients in fuel cell stacks; and improved, simplified fuel distribution in fuel cell stacks.

The inlet fuel of a fuel cell stack is substantially evenly distributed to the fuel flow fields of all of the fuel cells in a fuel cell stack by providing fuel flow rate through each fuel distributing passageway which is substantially the same as that in each other fuel distributing passageway, with a simultaneous fuel front during fuel startup.

An inlet fuel distributor for a fuel cell stack comprises a plurality of inlet fuel distributing passageways in which the quantity and speed of the flow in all of the passageways will be substantially equal, and the time of the arrival of the fuel front will be substantially the same at all points along a fuel inlet manifold.

The passageways in an inlet fuel distributor for a fuel cell may be of substantially the same length and substantially the same flow cross section, or having cross sections which are proportional to length, that substantially simultaneously and uniformly deliver fuel across the entire length of a fuel inlet manifold. The inlet fuel distributing passageways may have uniform flow resistance characteristics.

The fuel cells may be aligned with their fuel inlets along a substantially straight line, the fuel distributing passageways directing fuel flow in the absence of radial flow to the fuel inlets, the fuel flow directed from each passageway being substantially parallel with the fuel flow directed from each other passageway.

In one form, an inlet fuel distributor comprises a plurality of channels formed in a relatively thin plate, the channels having substantially the same length, number of turns and flow cross section. Each channel may feed one or two exits into an inlet manifold to provide more uniform distribution.

In some embodiments, the passageways each have one or more exits configured to direct fuel against a surface, which may be flat, at the fuel flow field inlets, to flow fuel in directions not parallel with the passageways to mix the fuel more uniformly and avoid "jetting".

According to an embodiment, small liquid drain holes and/or liquid channels may be provided where necessary to avoid water accumulation, in any given implementation.

Other features and advantages will become more apparent in the light of the following detailed description of exemplary embodiments, as illustrated in the accompanying drawing.

BRIEF DESCRIPTION OF THE DRAWINGS

FIG. 5 is a perspective view illustrating an accumulated water outlet in an inlet fuel distributor FIG. 6 is a perspective view of the reverse side of the inlet fuel distributor shown in FIG. 5.

FIG. 7 is a schematic illustration of another alternative form of inlet fuel distributor.

MODE(S) OF IMPLEMENTATION

Figure 1:
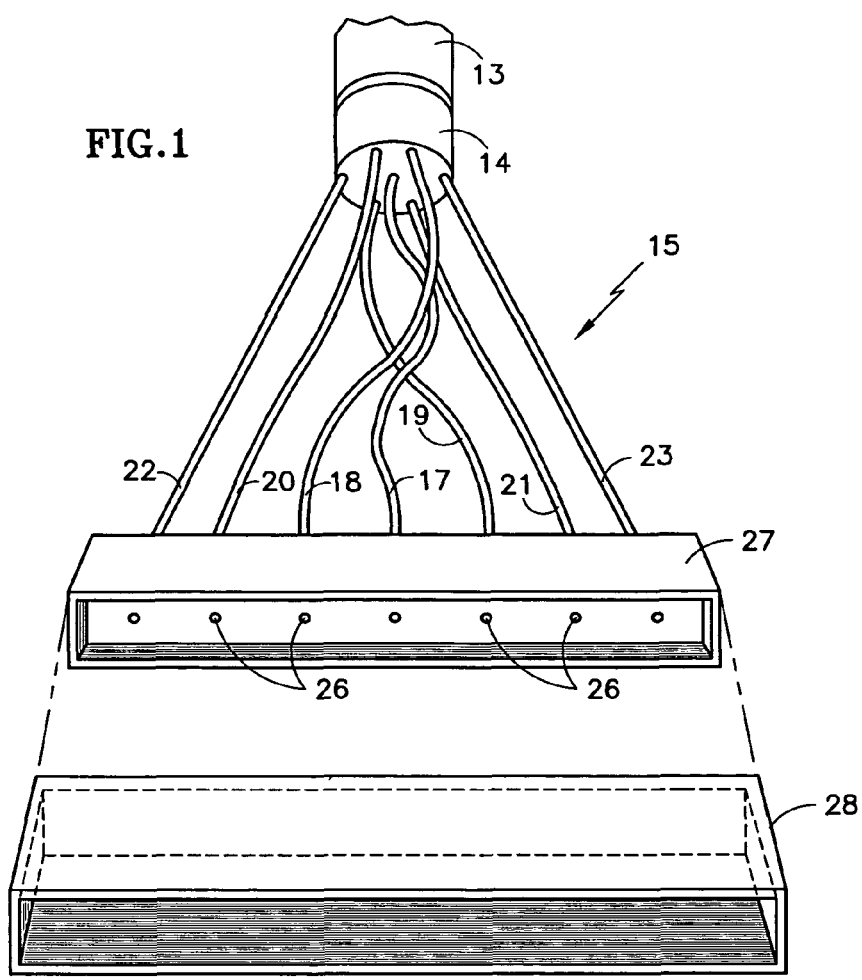
FIG. 1 is a simplified, stylized, top perspective view of a first embodiment.

A first embodiment of an inlet fuel distributor is illustrated in FIG. 1. A fuel supply conduit includes a pipe 13 feeding a chamber 14 out of which extend a plurality of fuel distribution passageways, such as tubes 17-23 of equal length and diameter, which terminate in corresponding exit holes 26 within a manifold cap 27. The manifold cap 27 is joined to a fuel inlet manifold 28. Because each of the tubes 17-23 is of the same diameter and the same length as each of the other tubes, the fuel will be distributed to all of the holes 26 in a substantially uniform manner. That is, when the fuel is first turned on, it will reach all of the holes 26 substantially simultaneously, and the quantity of fuel flow through each of the tubes will be substantially identical to the quantity of fuel flow in each other of the tubes. The holes 26 should be located such that there is one hole for every 10 to 20 cells. Alternatively, the distance between holes should be in the range of 40-80MM in a typical fuel cell stack with several hundred cells. Thus, a uniform flow with a substantially simultaneous fuel flow front is achieved by the embodiment of FIG. 1.

In certain instances, the amount of space, or volume, which is required in order to implement the embodiment of FIG. 1 may render it impractical. The ability to make the flow through the tubes 17-23 substantially simultaneous and identical becomes more difficult as the tubes become shorter, but is more easily achieved if the tubes are longer. Thus, the embodiment of FIG. 1 may present a conflict between simultaneous and uniform flow versus the volume of space required to achieve it.

Figure 2:
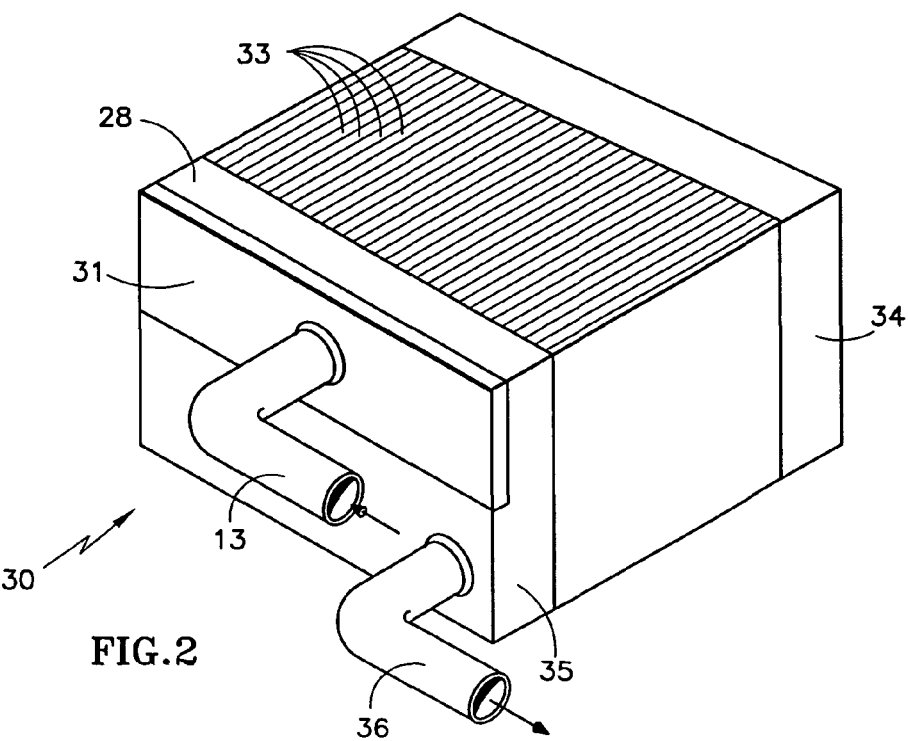
FIG. 2 is a perspective view of a fuel cell stack having an inlet fuel distributor.

Referring to FIG. 2, a more compact inlet fuel distributor 31 receives fuel from the fuel supply pipe 13 and provides it to the fuel inlet manifold 28. The fuel inlet manifold 28 provides fuel to all of the fuel cells 33 in the stack 30. In the two-pass configuration shown in FIG. 2, the fuel will flow from the fuel inlet manifold 28 to the right as seen in FIG. 2, across the top half of the fuel cells 33; then it will turn and flow downwardly and to the left in a fuel turnaround manifold 34, after which it will flow across the bottom half of the fuel cells 33 toward the left, as seen in FIG. 2, to the fuel exit manifold 35. Then it will pass through a fuel exhaust pipe 36, typically to a fuel recycle loop (not shown) which forms no part of the present disclosure.

Figure 3:
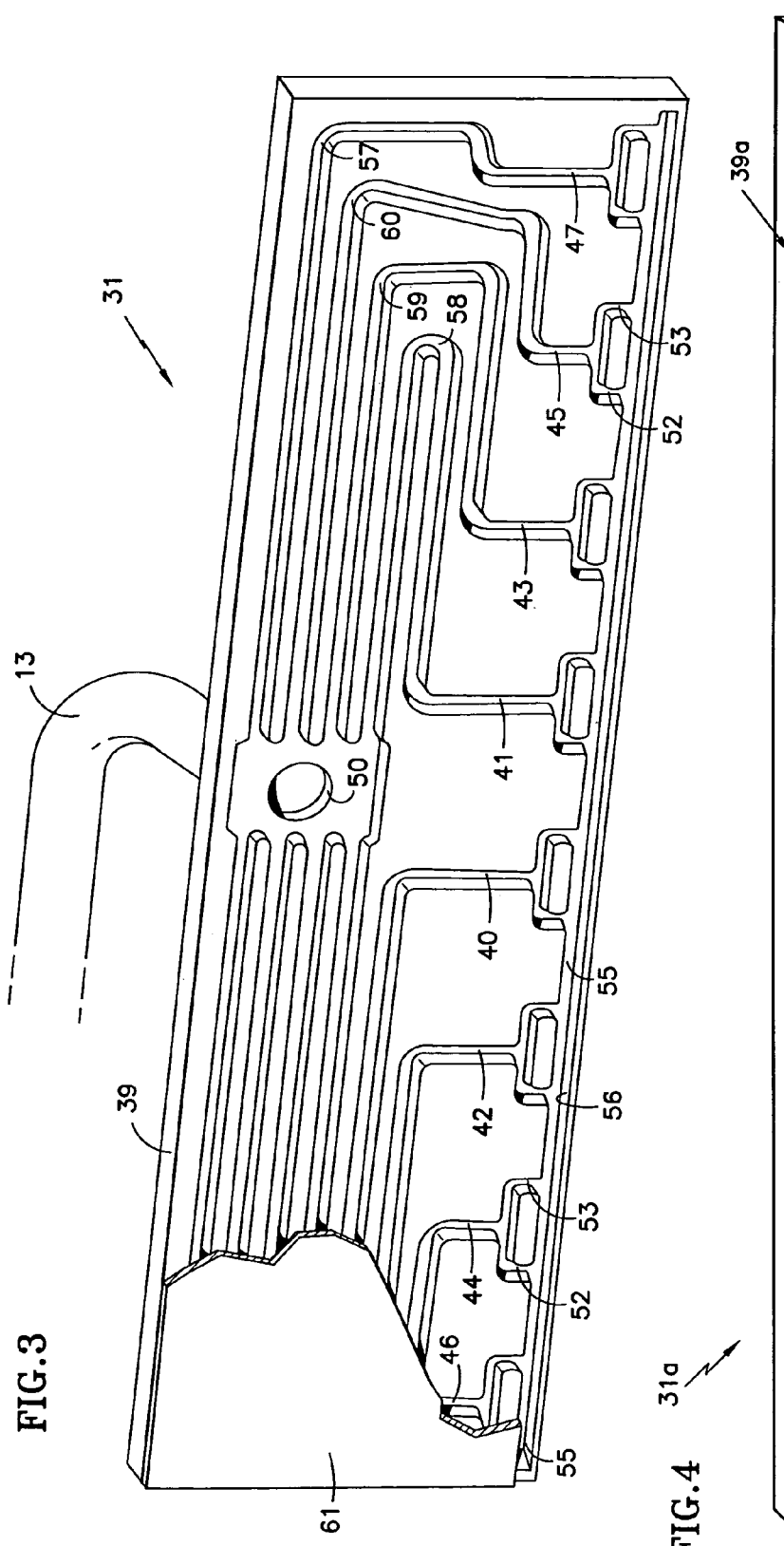
FIG. 3 is a perspective view of an inlet fuel distributor comprising channels formed in a plate.

Referring to FIG. 3, an inlet fuel distributor 31 may comprise a plate 39 of metal, plastic, fiber reinforced plastic composite, or any other material compatible with fuel cell stack operating conditions. A plurality of passageways, such as channels 40-47, extend outwardly from a fuel inlet 50. Each of the channels 40-47, in the embodiment of FIG. 3, is split so as to provide two exits that direct fuel into a slot 55. Impingement of the fuel onto a substantially flat bottom surface 56 of the slot causes the fuel to flow in dimensions not parallel with the channels, to mix the fuel more uniformly and avoid "jetting" as a result of fuel being expelled from the exits 52, 53. Thus, there will be a more uniform front of fuel presented by the slot 55 to the fuel inlet manifold 28 (FIG. 2), which is forward of the inlet fuel distributor 31 as seen in FIG. 2.

As illustrated in FIG. 3, the channels 40, 41 are substantially identical; the channels 42, 43 are substantially identical; the channels 44, 45 are substantially identical, and the channels 46, 47 are substantially identical, except for each being the mirror image of the other one of a pair. The length of each of the channels 40-47 is nearly identical to the length of each other one of the channels 40-47. The cross section flow area of each channel 40-47 is substantially identical to the cross sectional flow area of each other one of the channels 40-47. Thus, there is uniform fluidic flow resistance in all the channels.

In the embodiment of FIG. 3, the lengthwise turning location of each turn, such as the turn 57 in the slot 47, is not the same as the lengthwise turning location of a corresponding turn, such as the turns 58-60 in the channels 41, 43 and 45. By inspection of FIG. 3, it can be determined that the lengthwise turning locations between turns, such as turns 57-58 and the next turn along the channel, are also different (except for the mirror image of each other channel). However, to the extent that this makes a difference in flow or timing, the length can be adjusted so that the time that it takes, to flow from the fuel inlet to the slot 55 through any one of the channels and its accompanying inlets, will be the same as the time it takes to flow from the fuel inlet 50 to the slot 55 through any other channel and inlets. This may also affect the amount of flow; the amount of flow also can be adjusted by adjusting the cross sectional flow area, at least at some portion of selected channels, thereby to balance both the quantity of flow and the timing for a fuel front introduced into the fuel inlet 50 to reach the slot 55 through any of the channels 40-47. A thin plate 61 covers the channels 40-47, above the slot 55.

Figure 4:
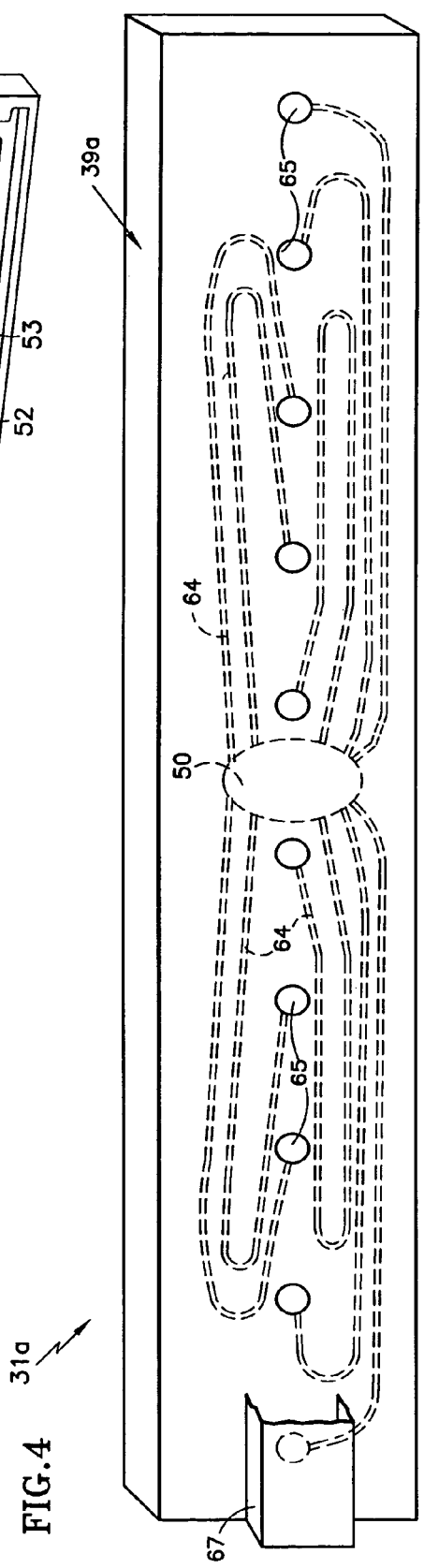
FIG. 4 is a schematic illustration of an alternative form of inlet fuel distributor.

An alternative form of inlet fuel distributor 31a is illustrated in FIG. 4, in which the channels 64 may have horizontal exits 65 (as viewed in FIGS. 2 and 4), there being only one exit 65 per channel 64, and the exits 65 may direct fuel to a baffle 67, or other surface, which may be part of the fuel inlet manifold 28 (FIG. 2).

FIG. 4 also illustrates that the channels need not be substantially orthogonal as in FIG. 3, but may take any desired shape. The choice of whether double or single exits 52, 53, 59 may be made to suit any desired implementation. The use of more exits 52, 53 tends to mix the flow more thoroughly, but fewer exits 65 may simplify the analysis and adjustment of the design to provide both uniform quantity and uniform timing of the fuel front, upon startup.

FIGS. 5 and 6 illustrate that a tendency for water accumulation, typically from recycle fuel which is provided to the fuel supply pipe 13 upstream of where shown in FIG. 2, may be accommodated by a small hole 62 at an appropriate point in one or more of the channels 40-47, such as the channel 41 illustrated in FIG. 5, with a minute drain channel 63 provided on the reverse side of the inlet fuel distributor 31. The channel 63 may simply exit into the fuel inlet manifold 28, at slot 55. The hole 62 must be sufficiently small that the amount of fuel which exits into the inlet manifold is insignificant.

Another embodiment, illustrated in FIG. 7, solves the water problem in a different fashion. Therein, all of the channels 67 are shaped so that there are no pockets or horizontal spots where water can accumulate. In other respects, the embodiment of FIG. 7 is the same as that of FIG. 3. As illustrated in FIG. 7, the channels 67 are not of equal length, but the shorter length is made up for by a sharper curvature therein and a longer length is made up for by a more gradual curvature therein. Tailoring as described hereinbefore may be utilized in any case to assure substantially simultaneous, substantially equal flow of fuel.

The present fuel inlet causes the fuel/air (or fuel/inert gas) interface, and other changes in the fuel flow, to arrive at the inlets of the fuel flow fields of all of the fuel cells simultaneously. This means that the differences between electrical activity within each of the fuel cells will be dependent upon the characteristic of the individual fuel cells, rather than on the fact that one fuel cell has received a greater change in the quantity of fuel than other fuel cells. This in turn allows the electrical potential of all of the cells to be more uniformly controlled, while at the same time minimizing any damage to the individual fuel cells, decreasing variations of performance, improving transient capability, and significantly increasing fuel cell life. In most applications, the present fuel inlet provides sufficient control over relative voltages of the fuel cells during startup so that an inert gas purging of the fuel flow fields need not be undertaken. Impingement of the fuel on the surface (56) spreads the fuel in dimensions not parallel with the passageways and prevents "jetting" of the flow due to sudden expansions. At start up, jetting tends to mix the fuel and the air volumes at the fuel/air interface, which creates heat and excessive voltages, and which creates a safety hazard due to the combustible nature of the mixture. During operation with a conventional manifold design, transient conditions result in flow mal-distribution at the fuel flow inlets. The mal-distribution can cause cell performance degradation. However, with this manifold, uniform flow to all the fuel flow field inlets is maintained during transient conditions.

The fuel inlet manifold may be used with fuel cell stacks other than PEM fuel cell stacks.

The aforementioned patent is incorporated herein by reference.

Thus, although exemplary embodiments have been shown and described, it should be understood by those skilled in the art that the foregoing and various other changes, omissions and additions may be made therein and thereto, without departing from the spirit and scope of the essence of the disclosure.

We claim:

1. A fuel cell fuel inlet apparatus for a plurality of fuel cells in a stack, comprising:
 a single fuel supply conduit;
 a surface configured to flow fuel into the fuel cells; and
 a plurality of mutually independent fuel distributing passageways, each said passageway having an inlet fluidically coupled directly to said fuel supply conduit and each said passageway having at least one exit configured to direct fuel to said surface, each said passageway configured to conduct, from said fuel supply conduit to said surface, substantially the same amount of fuel per unit of time as each other passageway, and each said passageway configured to conduct fuel from said fuel supply conduit to said surface in substantially the same amount of time as each other passageway.

2. Apparatus according to claim 1 wherein:
 each of said at least one exits is configured to direct said fuel to a corresponding different portion of said surface.

3. Apparatus according to claim 1 wherein:
 each of said at least one exits is configured to direct said fuel to a corresponding different portion of said surface wherein said fuel is spread in dimensions not parallel with said passageways.

4. Apparatus according to claim 3 wherein:
 said fuel distributing passageways comprise cross sections which are proportional to length.

5. Apparatus according to claim 1 wherein:
 said plurality of fuel distributing passageways are configured having substantially the same length and substantially the same flow cross section wherein said fuel is simultaneously and uniformly deliverable to all of said fuel cells.

6. Apparatus according to claim 1 wherein:
 said plurality of fuel distributing passageways are each configured having the same total length and flow cross section and configured to flow said fuel through each said plurality of fuel distributing passageways at the same flow rate as that in each other passageway, with a simultaneous fuel front at all of the fuel cells.

7. Apparatus according to claim 1 wherein said surface comprises a portion of a fuel inlet manifold.

8. Apparatus according to claim 1 wherein:
 said plurality of fuel distributing passageways comprises a plurality of channels formed in a relatively thin plate, and each of said plurality of fuel distributing passageways are configured having substantially the same length, number of turns and flow cross section as each other one of said passageways.

9. Apparatus according to claim 8 wherein:
 said plate further comprises an inlet manifold; and
 each said channel comprises at least one of a first exit and a second exit into said inlet manifold.

10. Apparatus according to claim 9 wherein:
 at least one of said first exit and a second exit is configured to mix the flow of fluid in said inlet manifold.

11. Apparatus according to claim 8 wherein at least one of said plurality of channels is configured to prevent the accumulation of liquid.

12. Apparatus according to claim 8 wherein said plurality of fuel distributing passageways comprises at least one of a liquid drain hole and liquid flow channel configured to prevent obstruction of fuel flow by liquid.

13. Apparatus according to claim 1 wherein said surface is substantially flat.

14. A fuel cell stack comprising:
 a plurality of fuel cells; and
 a fuel cell fuel inlet apparatus according to claim 1.

15. A fuel cell stack having a fuel inlet apparatus, said stack comprising:
 a stack of fuel cells, said fuel cells aligned along a substantially straight first line;
 a single fuel supply conduit;
 a plurality of mutually independent fuel distributing passageways, each said passageway having an inlet fluidically coupled directly to said fuel supply conduit, each said passageway having at least one exit aligned along a substantially straight second line in proximity with and parallel to said first line, each said exit configured to direct fuel in the vicinity of a corresponding different group of said fuel cells, each said passageway configured to conduct, from said fuel supply conduit to said fuel cells, substantially the same amount of fuel per unit of time as each other passageway, and each said passageway configured to conduct fuel from said fuel supply conduit to said fuel cells in substantially the same amount of time as each other passageway.

16. A fuel cell stack having a fuel inlet apparatus, said stack comprising:
 a stack of fuel cells, said fuel cells aligned along a substantially straight first line;
 a single fuel supply conduit;
 a plurality of mutually independent fuel distributing passageways, each said passageway having an inlet fluidically coupled directly to said fuel supply conduit, each said passageway having at least one exit aligned along a substantially straight second line in proximity with and parallel to said first line, each said exit configured to direct fuel in the vicinity of a corresponding different group of said fuel cells, said passageways configured to flow fuel through each of said passageways at the same flow rate as the flow rate in each other one of said passageways and with a simultaneous fuel front at said second line.

17. A method of providing inlet fuel to a plurality of fuel cells in a stack, said method comprising:
 conducting, from a single fuel supply conduit through a plurality of mutually independent fuel distributing passageways, to each of said plurality of fuel cells, substantially the same amount of fuel as to each other one of said fuel cells, and conducting fuel from said fuel supply conduit through said plurality of fuel distributing passageways to each of said plurality of fuel cells in substantially the same amount of time as to each other one of said fuel cells.

18. A fuel cell stack having a fuel inlet apparatus, said stack comprising:
 a plurality of fuel cells;
 a single fuel supply conduit; and
 a plurality of mutually independent fuel distributing passageways, each said passageway having an inlet fluidically coupled directly to said fuel supply conduit, each said passageway having at least one exit aligned to direct flow of fuel substantially parallel with flow of fuel directed by others of said exits, each said exit configured to direct fuel in the vicinity of a corresponding different group of said fuel cells wherein fuel is spread among said fuel cells, each said passageway configured to conduct, from said fuel supply conduit to said fuel cells, substantially the same amount of fuel per unit of time as each other passageway, and each said passageway configured to conduct fuel from said fuel supply conduit to said fuel cells in substantially the same amount of time as each other passageway.

19. A fuel cell apparatus comprising:
a plurality of fuel cells in a stack;
a single fuel supply conduit;
a surface configured to flow fuel into each of the fuel cells; and
a plurality of mutually independent fuel distributing passageways, each said passageway having an inlet fluidically coupled directly to said fuel supply conduit and each said passageway having at least one exit configured to direct fuel to said surface, each said passageway configured to conduct, from said fuel supply conduit to said surface, substantially the same amount of fuel per unit of time as each other passageway, and each said passageway configured to conduct fuel from said fuel supply conduit to said surface in substantially the same amount of time as each other passageway.

* * * * *